June 10, 1930. T. H. DE HAVEN 1,763,095
CHAIN SAW
Filed March 19, 1929
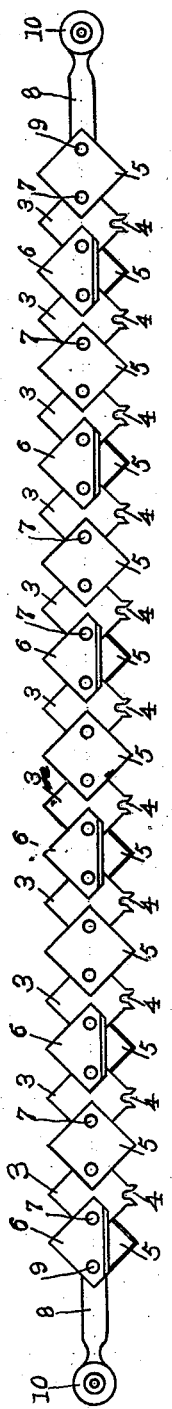
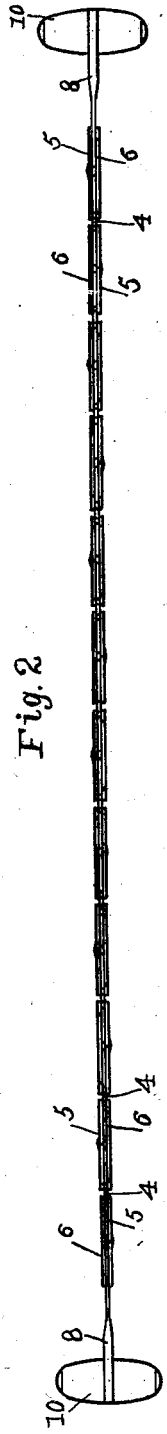
INVENTOR,
Thomas H. De Haven.
BY David E. Lain,
ATTORNEY.

Patented June 10, 1930

1,763,095

UNITED STATES PATENT OFFICE

THOMAS H. DE HAVEN, OF BELLINGHAM, WASHINGTON

CHAIN SAW

Application filed March 19, 1929. Serial No. 348,185.

My invention relates to improvements in chain saws and has for an object to provide a one-man saw suited for cutting down trees, sawing off logs, and the like, with minimum expenditure of effort and time.

Another object of my improvement is to provide a saw in which each tooth and raker thereof may to some extent turn back on a pivot from the work and thus increase the "draw" of the stroke or diminish the angle between the cutting edges and the direction of movement of the saw.

Another object of my improvement is to provide a saw with increased facilities for the escape of sawdust from the kerf being cut thereby.

Another object of my improvement is to provide a saw which may be rolled up in the plane of its teeth for increased portability.

Other objects of my improvement will appear as the description proceeds.

I attain these and other objects of my improvement with the mechanism illustrated in the accompanying sheet of drawings, forming a part of this specification, in which Figure 1 is a side elevation of my saw and Fig. 2 is a plan view of the cutting edge.

Similar characters refer to similar parts throughout.

With more particular reference to the designated parts: The saw consists of a series of alternating cutting teeth and raker teeth articulated with rivets in chain relation. Each of raker teeth 4 is joined by rivets 7, disposed equidistant therefrom, between cutting teeth 5, 5. Said cutting teeth 5, 5 are each alone on a link with rivets therethrough equidistant therefrom and disposed on opposite sides of raker 4.

Links 6, 6, having no teeth thereon, form pairs with teeth 5, 5, so that each end of said raker 4 is engaged for oscillation by rivets 7, 7 with one of link pairs 5, 6.

For the benefit of the illustration, the tops 3 and bottoms 4 of the rakers and the tops and bottoms of teeth 5 extend equally above and below the rivets and the tops of links 6 are of a similar height but the bottoms thereof terminate near said rivets.

The heads of rivets 7 are in countersunk holes and do not extend beyond the outer surfaces of the said teeth and links, and said rivets are sufficiently easy in the holes in said teeth rakers and links through which they extend to allow free articulation thereof.

The edges of the lower ends of teeth 5 are beveled and the points thereof are set in the usual saw-tooth form.

The ends 4 of the rakers are bifurcated and sharpened in the usual raker shape.

The ends of the saw terminate in link pairs 5, 6 and handle straps 8, 8 are connected therewith by rivets 9, 9 and to the end of each of said straps is fastened one of a pair of saw handles 10, preferably shaped to fit in a single clasped hand and long enough to be grasped by two hands.

Because of the limitations of the drawing only a short saw is shown, but by continued duplication of the parts connected as shown any desired length may be made.

In practice, several different useful shapes of the saw and raker teeth and links have been made and used, and the particular shapes shown are, as stated, for the benefit of this specification, but all useful shapes thereof are within the purview of my invention. However, in practice, it has been found to be essential that but one cutting tooth or but one raker tooth should be used on a link and said tooth should be centrally disposed relative to the rivets therethrough.

Sawing operations force rakers 4 and teeth 5 backward in oscillation causing the cutting surfaces thereof to incline farther thereto.

Having thus disclosed my invention, what I claim as new therein and desire to secure by Letters Patent is,—

1. A chain saw consisting of links having raker teeth alternating with cutting teeth said cutting teeth disposed in staggered relation alternately on opposite sides of said raker teeth, each of said cutting teeth disposed alone on its link midway between the rivets therethrough and each of said raker teeth disposed alone on its link midway between the rivets therethrough.

2. A chain saw consisting of raker teeth alternating with cutting teeth individually pivoted to each other for articulation in chain relation said cutting teeth each medially located alone on a link disposed in staggered relation alternately on opposite sides of said raker teeth.

3. A chain saw consisting of raker teeth alternating with pairs of individual medially-disposed cutting teeth and links said raker teeth pivoted for articulation in chain relation between the ends of said pairs of cutting teeth and links said cutting teeth of said pairs disposed alternately on opposite sides of said raker teeth.

4. A chain saw consisting of raker teeth alternating with pairs of cutting teeth and links said raker teeth pivoted for articulation in chain relation between the ends of said pairs of cutting teeth and links said cutting teeth of said pairs disposed alternately on opposite sides of said raker teeth, and handles fastened to the ends of said chain saws.

THOMAS H. DE HAVEN.